No. 828,452. PATENTED AUG. 14, 1906.
H. BARRY.
WEED EXTRACTOR.
APPLICATION FILED AUG. 22, 1905.
Fig. 1.
Fig. 2.
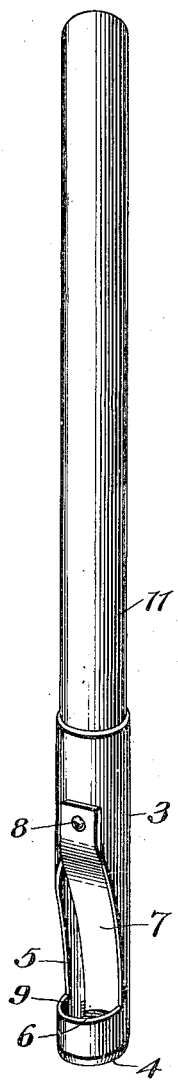
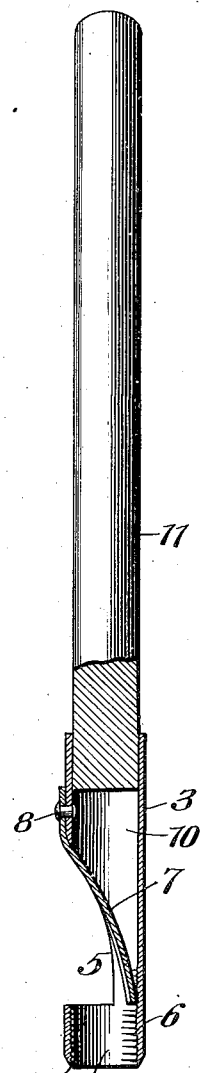
Witnesses
M. C. Lyddane
B. G. Foetr
Inventor
Henry Barry
By E. G. Siggers
Attorney

UNITED STATES PATENT OFFICE.

HENRY BARRY, OF CHICAGO, ILLINOIS.

WEED-EXTRACTOR.

No. 828,452.  Specification of Letters Patent.  Patented Aug. 14, 1906.

Application filed August 22, 1905. Serial No. 275,254.

*To all whom it may concern:*

Be it known that I, HENRY BARRY, a citizen of the United States, residing at Chicago, in the county of Cook and State of Illinois, have invented a new and useful Weed-Extractor, of which the following is a specification.

This invention relates to means for removing weeds from turf and soil; and the object of the invention is to provide a simple article by means of which weeds can be effectively extracted with rapidity, each weed being expelled from the article by the next one pulled, so that the operation of the extractor is made very easy.

A further object is to provide a device of the above character that can be cheaply manufactured and is made up of parts that are not liable to breakage or derangement.

The preferred embodiment of the invention is illustrated in the accompanying drawings, wherein—

Figure 1 is a perspective view of the extractor, and Fig. 2 is a longitudinal sectional view therethrough.

Similar reference-numerals designate corresponding parts in both the figures of the drawings.

In the embodiment illustrated a tubular open-ended and preferably cylindrical body 3 is employed, the lower end of which is provided with a sharpened cutting edge 4, said body also having an opening 5 in one side, which opening tapers toward its upper end. The inner side of the lower portion of the body below the opening 5 may be roughened, as shown at 6. A guide in the form of a plate 7 extends through the top of the side opening 5 at an inclination downwardly to the opposite side and toward the cutting edge 4, this guide being secured in place by any suitable means—as, for instance, a rivet 8 passing through its upper end and through the adjacent wall of the body. Said guide therefore divides the interior of the body into a lower weed-receiving compartment 9, the walls of which are roughened, and an upper handle-receiving socket 10, a handle 11 having its lower end fitted in said socket.

In using the device the operator places the cutting edge about the crown of the weed to be removed and forces the lower part of the body into the soil, thereby surrounding the upper portion of the weed-root. Consequently the said portion will be clamped in the weed-receiving compartment and will be held by the roughened face. Upon withdrawing the extractor the weed will be removed with it, and when the device is placed over another weed and again forced into the earth, the extracted weed will be moved upwardly and directed out through the side opening 5 by the guide 7. By this device, therefore, weeds can be rapidly and effectively removed, and by having the handle of sufficient length the operator may work without stooping or bending.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a weed-extractor, a tubular open-ended body having a circular cutting edge at its lower end and an upwardly-tapering opening at its side, an inclined guide-strip having its end secured outside the body above the opening, said strip extending through the top of the opening downwardly at an inclination across the interior of said body to the opposite wall, said guide-strip defining a weed-receiving compartment below the same and a handle-receiving socket above it, and a handle-stick separate from the guide-strip, said stick having its lower end located in the receiving-socket above said guide-strip.

2. In a weed-extractor, a body provided with a weed-receiving compartment having an open lower end and an open side, said body having a cutting edge at its lower end and having its inner face above the cutting edge roughened to hold the material forced into the compartment through the lower end from dropping therefrom, an inclined guide constituting the top of the compartment and moving the weeds to the side opening, and a handle secured to the body.

In testimony that I claim the foregoing as my own I have hereto affixed my signature in the presence of two witnesses.

HENRY BARRY.

Witnesses:
 H. O. FLECK,
 J. H. McDONOUGH.